United States Patent [19]

Inoue et al.

[11] Patent Number: 5,344,879
[45] Date of Patent: Sep. 6, 1994

[54] CURABLE COMPOSITION FOR PAINT

[75] Inventors: Masaharu Inoue, Kobe; Yoshihiko Okimura, Takasago; Hirotoshi Kawaguchi; Hisao Furukawa, both of Kobe, all of Japan

[73] Assignee: Kanegafuchi Kagaku Kogyo Kabushiki Kaisha, Osaka, Japan

[21] Appl. No.: 5,130

[22] Filed: Jan. 15, 1993

[30] Foreign Application Priority Data

Jan. 17, 1992 [JP] Japan .................................. 4-006794
Jun. 16, 1992 [JP] Japan .................................. 4-156705

[51] Int. Cl.$^5$ ........................................... C09D 143/04
[52] U.S. Cl. .................................. 525/100; 525/102; 525/146; 525/185
[58] Field of Search ................. 525/100, 102, 146, 185

[56] References Cited

U.S. PATENT DOCUMENTS 4,746,702 5/1988 Greco et al. ........................ 525/100
4,975,488 12/1990 Furukawa et al. ................. 525/100

FOREIGN PATENT DOCUMENTS 480363 4/1992 European Pat. Off. .
60-44552 3/1985 Japan .

*Primary Examiner*—Ralph H. Dean
*Attorney, Agent, or Firm*—Armstrong, Westerman, Hattori, McLeland & Naughton

[57] ABSTRACT

A curable composition for paint including
 (A) 10 to 99 parts by weight of a vinyl polymer having a number average molecular weight of not less than 2,000 and at least one silicon atom to which a hydrolyzable group is bonded at an end of the main chain and/or in a side chain thereof, in one molecule, wherein the main chain is substantially a vinyl polymer chain;
 (B) 1 to 90 parts by weight of a compound containing a carbonyldioxy group which is at least one of
  (i) a compound containing a hydrolyzable silyl group, the compound having at least one carbonyldioxy group in one molecule and at least one silicon atom to which a hydrolyzable group is bonded, in one molecule, and
  (ii) a polycarbonate polyol compound having at least one carbonyldioxy group and at least two hydroxyl groups in one molecule; and
 (C) 0.001 to 10 parts by weight of a curing catalyst on the basis of 100 parts by weight of the components (A) and (B) in total.

This curable composition for paint has excellent high solid content and one package storage stability as well as superior scratch resistance and acid resistance.

5 Claims, No Drawings

CURABLE COMPOSITION FOR PAINT

BACKGROUND OF THE INVENTION

The present invention relates to a curable composition for paint which has low toxicity and high solid content, and improved acid resistance, scratch resistance, storage stability as a one package and curability. More particularly, the invention relates to a curable composition useful as a paint for top coatings of automobiles.

Hitherto, the resins for paint which have been used for coating automobiles, outer walls of buildings, industrial equipments, stem furnitures, plastics and the like, are mainly melamine resins such as an alkydmelamine and an acryl-melamine or two component urethane resins.

Among them, the melamine resins involve the problems that harmful formalin arises in curing and that the cured films are spoiled with acid rain because of poor acid resistance. In the case of the two component urethane resins, the toxicity of the isocyanate compound used in a manufacturing process becomes a problem.

In order to solve such problems, the present inventors had studied the use of a vinyl polymer having a silicon atom to which a hydrolyzable group is bonded (hereinafter also referred to as "hydrolyzable silyl group") for paint. As a result, it was found that the use of the above-mentioned vinyl polymer solved the above-mentioned problems and the resin was a curable paint resin having an excellent weatherability, as described in the previously filed patent applications (refer to Japanese Unexamined Patent Publication No. 132977/1988 and the like).

The above-mentioned vinyl polymer having a hydrolyzable silyl group is cured according to the following mechanism. Namely, the silyl group therein is hydrolyzed by moisture in air, stable siloxane bonds are formed through condensation reaction, and then the vinyl polymer is cured. Therefore, the above-mentioned vinyl polymer has excellent chemical resistance and weatherability in comparison with the melamine resins such as acryl-melamine and alkyd-melamine or the two component urethane resins.

However, when the above-mentioned vinyl polymer having a hydrolyzable silyl group is used as a paint for top coatings of automobiles, the following problems arise.

Firstly, scratch resistance to a brush for car washing and cloud of sand caused in running is insufficient. When a flexible component such as a polyester component is copolymerized, or blended with the above-mentioned vinyl monomer in order to improve the scratch resistance, the acid resistance of the resulting film is deteriorated.

Secondly, in recent years a high solid paint is required, because there arises the movement to control the total amount of solvent which volatilizes during the paint coating, as the VOC (volatile organic compounds) control in U.S.A. However, in the case of a paint consisting of only the above-mentioned polymer it is difficult to obtain a high solid content paint satisfactory for the VOC control in U.S.A.

Thirdly, when a tin compound such as di-n-butyl tin (IV) dilaurate, a sulfonic acid such as p-toluenesulfonic acid, or a phosphoric ester including an acid phosphate such as di( 2-ethylhexyl)phosphate is added as a catalyst, one package storage stability is not always sufficient due to their high activities even at ordinary temperature.

An object of the invention is to provide a curable composition for paint having excellent high solid content and one package storage stability as well as superior scratch resistance and acid resistance.

This and other objects of the present invention will become apparent from the description hereinafter.

SUMMARY OF THE INVENTION

In accordance with the present invention, there is provided a curable composition for paint comprising (A) 10 to 99 parts by weight of a vinyl polymer having a number average molecular weight of not less than 2,000 and at least one silicon atom to which a hydrolyzable group is bonded at an end of the main chain and/or in a side chain thereof in one molecule, wherein the main chain comprises substantially a vinyl polymer chain;

(B) 1 to 90 parts by weight of a compound containing a carbonyldioxy group which is at least one of
  (i) a compound containing a hydrolyzable silyl group, the compound having at least one carbonyldioxy group in one molecule and at least one silicon atom to which a hydrolyzable group is bonded in one molecule, and
  (ii) a polycarbonate polyol compound having at least one carbonyldioxy group and at least two hydroxyl groups in one molecule; and (C) 0.001 to 10 parts by weight of a curing catalyst on the basis of 100 parts by weight of the components (A) and (B) in total.

The composition of the present invention has low toxicity and high solid content and gives a superior coating film having improved and well-balanced acid resistance, scratch resistance and curability. Furthermore, the composition of the present invention is a curable composition for paint having a good storage stability as a one package paint.

DETAILED DESCRIPTION

The vinyl polymer containing a hydrolyzable silyl group used as the component (A) in the present invention is a polymer having at least one, preferably 2 to 10 silicon atoms to which a hydrolyzable group is bonded (hereinafter referred to as "hydrolyzable silyl group") at an end of the main chain and/or a side chain thereof in one molecule, wherein the main chain is substantially a vinyl polymer chain. When the number of the hydrolyzable silyl group is less than 1 per molecule, the effects caused by siloxane bond, such as weatherability and chemical resistance, are not fully shown because crosslinking density becomes too small. In contrast, when the number of the hydrolyzable silyl group is more than 10 per molecule, the internal stress of the cured film becomes too strong, and the films are apt to crack.

By reason that the vinyl polymer containing a hydrolyzable silyl group (A) comprises substantially a vinyl polymer chain, the cured product therefrom has excellent weatherability, chemical resistance and the like. Furthermore, it is possible to design a wide range of resins including from soft resin to hard resin by changing constitution of a copolymer. The vinyl polymer (A) of the present invention comprises vinyl monomer units usually in an amount of approximately not less than 60 % (% by weight, hereinafter the same), preferably in an amount of approximately not less than 80 %, based on the units constructing the main chain. Therefore, the vinyl polymer of the component (A) may contain urethane bond, siloxane bond and the like in the main chain or side chain in part.

Examples of the above-mentioned hydrolyzable substituted silyl group are, for instance, groups having the formula (III):

wherein $R^3$ is an alkyl group having 1 to 10, preferably 1 to 4 carbon atoms, $R^4$ is a hydrogen atom or a monovalent hydrocarbon group selected from the group consisting of an alkyl group having 1 to 10, preferably 1 to 4 carbon atoms, an aryl group having 6 to 10 carbon atoms and an aralkyl group having 7 to 10 carbon atoms, and when the number of each of $R^3$ and $R^4$ is two or more, the plural $R^3$ groups or the plural $R^4$ groups may be the same or different; c is 0, 1 or 2.

When the number of carbon atoms of the above-mentioned group $R^3$ is more than 10, the hydrolysis reactivity of the hydrolyzable silyl group is lowered. When the group $R^3$ is a group other than the alkyl group, for instance, phenyl group or benzyl group, the hydrolysis reactivity is also lowered. Examples of the groups $R^3$ are, for instance, methyl, ethyl, n-propyl, isopropyl, n-butyl, isobutyl, hexyl, octyl, and the like.

As the typical examples of the alkyl group as $R^4$, there are cited the same examples as cited as the alkyl group as $R^3$. Examples of the aryl group as $R^4$ are, for instance, phenyl, tolyl, cumenyl and the like. Examples of the aralkyl group as $R^4$ are, for instance, benzyl, phenethyl and the like.

The above-mentioned hydrolyzable silyl group having the formula (III) may be contained at an end of the main chain, or in a side chain, or both at an end of the main chain and in the side chain of the vinyl polymer as the component (A).

When the molecular weight of the vinyl polymer (A) is too small, curability and weatherability deteriorate. Therefore, a vinyl polymer (A) having a number average molecular weight of not less than 2,000, preferably from 3,000 to 10,000, is used. When the above-mentioned molecular weight is more than 10,000, the viscosity of the vinyl polymer becomes high. As a result, it becomes necessary to lower the concentration of solid matter in a paint.

When the molecular weight of the vinyl polymer (A) per hydrolyzable silyl group becomes too large, the effect of the present invention is not fully shown by reason that the number of siloxane bonds formed is small. In contrast, when the molecular weight is too small, the internal stress becomes large. Therefore, the molecular weight of the vinyl polymer (A) per hydrolyzable silyl group is preferably from 300 to 5,000, more preferably from 350 to 2,500.

The vinyl polymer (A) of the present invention is generally composed of units derived from a vinyl monomer, units derived from a monomer containing a hydrolyzable silyl group, and the like.

The above-mentioned vinyl monomers for the vinyl polymer (A) are not particularly limited. Typical examples of the vinyl monomers are, for instance, (meth)acrylates (the term means both acrylate and methacrylate, hereinafter the same) such as methyl (meth)acrylate, ethyl (meth)acrylate, butyl (meth)acrylate, isobutyl (meth)acrylate, 2-ethylhexyl (meth)acrylate, isobornyl (meth)acrylate, stearyl (meth)acrylate, benzyl (meth)acrylate, cyclohexyl (meth)acrylate, trifluoroethyl(meth)acrylate and pentafluoropropyl(meth)acrylate; unsaturated polycarboxylic acid esters including diesters or half esters of an unsaturated polycarboxylic acid (maleic acid, fumaric acid, iraconic acid or the like) with a linear or branched alcohol having 1 to 20 carbon atoms; aromatic hydrocarbon vinyl compounds such as styrene, α-methylstyrene, chlorostyrene, styrenesulfonic acid, 4-hydroxystyrene and vinyl toluene; vinyl esters or allyl compounds such as vinyl acetate, vinyl propionate and diallyl phthalate; vinyl compounds containing a nitrile group such as acrylonitrile and methacrylonitrile; vinyl compounds containing an epoxy group such as glycidyl (meth)acrylate; vinyl compounds containing a basic nitrogen atom such as dimethylaminoethyl (meth)acrylate, diethylaminoethyl (meth)acrylate, vinylpyridine and aminoethyl vinyl ether; vinyl compounds containing an amide group such as (meth)acrylamide (the term means both acrylamide and methacrylamide, hereinafter the same), itaconic diamide, α-ethyl-(meth)acrylamide, crotonamide, maleic diamide, fumaric diamide, N-vinylpyrrolidone, N-butoxymethyl (meth)acrylamide, N,N-dimethyl acrylamide, N-methyl acrylamide and acryloyl morpholine; vinyl compounds containing a hydroxyl group such as 2-hydroxyethyl (meth)acrylate, 2-hydroxypropyl (meth)acrylate, 2-hydroxyethyl vinyl ether, N-methylol (meth) acrylamide, "Aronix M-5700" (which is commercially available from Toagosei Chemical Industry Co., Ltd.), and "PLACCEL FA-1", "PLACCEL FA-4", "PLACCEL FM-1", "PLACCEL FM-4" (which are commercially available from Daicel Chemical Industries, Ltd.); unsaturated carboxylic acids such as acrylic acid, methacrylic acid, maleic acid, fumaric acid or iraconic acid, salts thereof (an alkali metal salt, ammonium salt, amine salt or the like), anhydrides thereof (maleic anhydride, iraconic anhydride or the like); other vinyl compounds such as vinyl methyl ether, vinyl chloride, vinylidene chloride, chloroprene, propylene, butadiene, isoprene, maleimide, N-vinylimidazole, vinylsulfonic acid; and the like.

Such vinyl monomers may be used alone, or if necessary, as a mixture thereof.

An example of the monomer containing a hydrolyzable silyl group is monomers containing a hydrolyzable silyl group represented by the above-mentioned formula (III). Examples of an alkoxy silyl group-containing vinyl monomer, which is a typical example of the monomer having a hydrolyzable silyl group, are as follows:

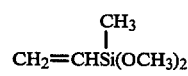

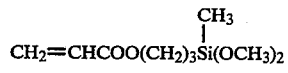

-continued

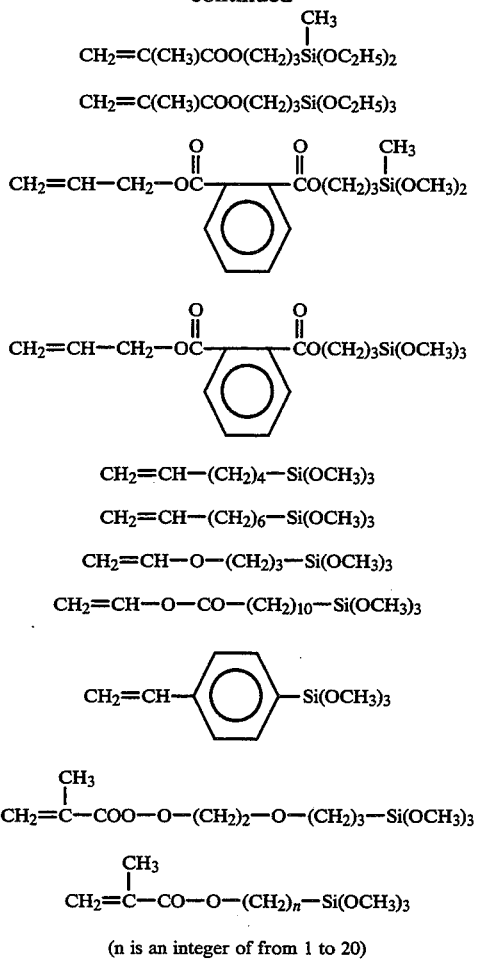

(n is an integer of from 1 to 20)

The vinyl polymer (A) contains preferably from 5 to 90%, more preferably from 11 to 70%, of units derived from the monomer containing a hydrolyzable silyl group.

Generally, examples of the process for preparing the polymer (A) are methods of copolymerizing the above-mentioned monomer containing a hydrolyzable silyl group and the above-mentioned vinyl monomer, for instance, as described in Japanese Unexamined Patent Publication No. 36395/1979, No. 36109/1982, No. 5953/1982, No. 157810/1983, and the like. Especially, it is preferable to prepare the vinyl polymer (A) by a solution polymerization using an azo radical polymerization initiator such as azobisisobutyronitrile from the viewpoints such as easy treatment.

If necessary, there may be used a chain transfer agent for controlling the molecular weight of the vinyl polymer (A). Examples of the chain transfer agents are, n-dodecyl mercaptan, t-dodecyl mercaptan, n-butyl mercaptan, γ-mercaptopropyltrimethoxysilane, γ-mercaptopropyltriethoxysilane, γ-mercaptopropylmethyldimethoxysilane, γ-mercaptopropylmethyldiethoxysilane, (CH₃O)₃Si—S—S—Si(OCH₃)₃, (CH₃O)₃Si—(CH₂)₃—S—S—(CH₂)₃—Si(OCH₃)₃, (CH₃O)₃Si—S—S—Si(OCH₃)₃, and the like. Particularly, when a chain transfer agent having a hydrolyzable silyl group in its molecule, such as γ-mercaptopropyltrimethyoxysilane is used, it is possible to prepare a vinyl copolymer in which a hydrolyzable silyl group is introduced at the end thereof.

Non-reactive solvents are used in the above-mentioned solution polymerization without particular limitations. Examples of the non-reactive solvents are hydrocarbons such as toluene, xylene, n-hexane and cyclohexane; acetic esters such as ethyl acetate and butyl acetate; alcohols such as methanol, ethanol, isopropanol and n-butanol; ethers such as ethyl cellosolve, butyl cellosolve and cellosolve acetate, ketones such as methyl ethyl ketone, ethyl acetoacetate acetylacetone, diacetone alcohol, methyl isobutyl ketone, acetone and the like.

The compound containing a carbonyldioxy group used as the component (B) in the present invention is (i) a compound containing a hydrolyzable silyl group which has at least one, preferably 1 to 10, more preferably 2 to 6 silicon atoms to which a hydrolyzable group (hydrolyzable silyl group) is bonded, per molecule and at least one, preferably 1 to 20, more preferably 2 to 10 carbonyldioxy groups represented by the formula:

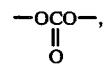

per molecule, or (ii) a polycarbonate polyol compound, the compound having at least one, preferably 1 to 20, more preferably 2 to 10 carbonyldioxy groups per molecule and at least two, preferably 2 to 10, more preferably 2 to 6 hydroxyl groups per molecule. The compound containing a hydrolyzable silyl group (i) suitably has a number average molecular weight of at most 3,000, preferably less than 2,000, more preferably less than 2,000 and not less than 300, most preferably from 1,500 to 300. The polycarbonate polyol compound (ii) suitably has a number average molecular weight of at most 3,000, preferably less than 2,000, more preferably less than 2,000 and not less than 300, most preferably from 1,500 to 250.

When the compound containing a hydrolyzable silyl group (i) is used as the component (B), the component (i) has a hydrolyzable silyl group in addition to a carbonyldioxy group. Therefore, the component (i) reacts with the vinyl polymer containing a hydrolyzable silyl group as the component (A) or the molecules of the component ( i ) react mutually to form stable siloxane bonds. Because of the presence of both the siloxane bond and the carbonyldioxy group, the resulting composition gives a film having sufficient scratch resistance while maintaining sufficient acid resistance. In addition, since the component (i) has a comparatively low molecular weight, it is useful to obtain a high solid paint.

An example of the above-mentioned hydrolyzable silyl group is a hydrolyzable silyl group represented by the above-mentioned formula (III). When the number of carbon atoms in $R^3$ of the formula (III) is more than 10, the hydrolysis reactivity of the hydrolyzable silyl group lowers. When $R^a$ is a group other than an alkyl group, for instance, phenyl group or benzyl group, the hydrolysis reactivity of the hydrolyzable silyl group also lowers. Concrete examples of $R^3$ are, for instance, methyl, ethyl, n-propyl, isopropyl, n-butyl and isobutyl. Concrete examples of $R^4$ are, for instance, alkyl groups such as the same groups as the examples of the alkyl group as $R^3$, aryl groups such as phenyl and aralkyl groups such as benzyl.

When the compound (i) containing a hydrolyzable silyl group as the component (B) has more than 20 carbonyldioxy groups, the acid resistance of the cured product tends to lower, and the viscosity of the paint composition tends to rise. When the compound (i) has more than 10 hydrolyzable silyl groups, the internal stress of the cured product tends to increase. When the number average molecular weight of the component (i) is less than 300, the component (i) is not suitable to prepare a high solid paint, because the component (B) has volatility and is hard to become a solid component. On the other hand, when the number average molecular weight of the component (i) is more than 3,000, it is difficult to obtain a high solid paint composition, because the viscosity of the component (B) itself rises.

It is preferable that the above-mentioned compound (i) containing a hydrolyzable silyl group as the component (B) is composed mainly, more preferably of 50% or more of (ia) a hydrolyzable silyl group-containing compound having the formula (I):

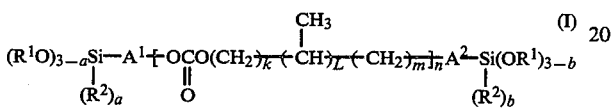

wherein $R^1$ and $R^2$ are the same or different and each is an alkyl group having 1 to 4 carbon atoms, and when two or more $R^1O$ groups or two or more $R^2$ groups are bonded to one silicon atom, the plural $R^1$ groups or the plural $R^2$ groups may be the same or different; $A^1$ and $A^2$ are the same or different and each is a divalent organic group containing at least one organic group selected from the group consisting of a polymethylene group, a polyurethane group, a polyurea group, a polyether group, a polyamide group and an organopolysiloxane group; a and b are the same or different and each is 0, 1 or 2; k and m are the same or different and each is 0 or an integer of 1 to 10, and L is 0, 1 or 2 provided that the following equation is satisfied: $k+L+m \geq 2$; and n is an integer of 1 to 20, (ib) a compound containing a hydrolyzable silyl group having the formula (II):

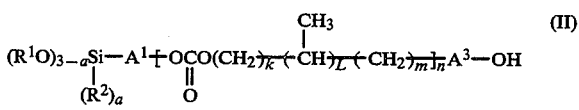

wherein $R^1$, $R^2$, $A^1$ a, k, L, m and n are the same as defined above, and $A^3$ is a divalent organic group containing at least one organic group selected from the group consisting of a polymethylene group, a polyurethane group, a polyurea group, a polyether group, a polyamide group and an organopolysiloxane group, or (ic) a mixture of the hydrolyzable silyl group-containing compound having the formula (I) and the hydrolyzable silyl group-containing compound having the formula (II).

When the component (B) is a mixture of the compound having the formula (I) and the compound having the formula (II), the mixing ratio by weight of the compounds (I) and (II) is preferably from 100/0 to 25/75, more preferably from 100/0 to 50/50, most preferably from 90/10 to 50/50 from the view point of the viscosity of the instant paint composition and the physical properties of the film formed from the composition, such as durability.

Preferable examples of the above-mentioned $A^1$, $A^2$ or $A^3$ are, for instance, $—(CH_2)_3—$,

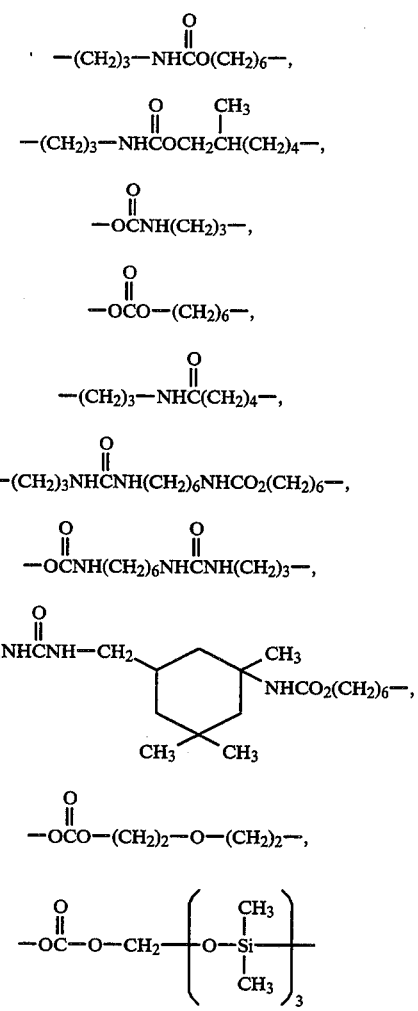

The above-mentioned compound (i) containing a hydrolyzable substituted ailyl group as the component (B) may have a hydroxyl group as the compound of the formula (II). When the hydrolyzable silyl group-containing compound has a hydroxyl group, the hardness of the coating film increases, because the hydroxyl groups also contribute to crosslinking at a high curing temperature. However, when the content of hydroxyl groups in the component (B) is too high and a considerable amount of hydroxyl groups remain in the film, the water resistance of the film tends to lower. In the case of the hydrolyzable silyl group-containing compound having a hydroxyl group, the hydroxyl value of the component (B) is preferably at most 250 KOH mg/g, more preferably at most 200 KOH rag/g, in particular at most 150 KOH mg/g.

The compound containing a hydrolyzable silyl group as the component (B) can be synthesized by a reaction of a polycarbonate polyol such as polyhexamethylene carbonate diol, polyhexamethylene carbonate triol or polytetramethylene carbonate diol with an isocyanatosilane such as 3-isocyanatopropyltrimethoxysilane, 3-isocyanatopropyltriethoxysilane or 3-isocyanatopropyldimethoxymethylsilane.

Concrete examples of the above-mentioned polycarbonate polyol are diols such as "PLACCEL CD-205PL", "CD-208PL" and "CD-210", triols such as "CD-305" and "CD-308" and tetraols such as "CD-610"

(which all are commercially available from DAICEL CHEMICAL INDUSTRIES, LTD. ). As the number of hydroxyl groups, in one molecule, of the polycarbonate polyol used to be reacted with the isocyanatosilane increases as in the order of diol, triol and tetraol, the hardness of the film tends to increase.

The above synthesizing reaction is carried out at preferably at most 80° C., more preferably at most 50° C., most preferably at most 30° C. Further, it is necessary that the reaction atmosphere, the solvent and the raw materials used in the reaction are sufficiently dried and free from water.

In the above reaction, the equivalent ratio of isocyanate groups and hydroxyl groups is preferably from 0.05/1.0 to 1.0/1.0, more preferably from 0.1/1.0 to 1.0/1.0, most preferably from 0.2/1.0 to 1.0/1.0. When the above-mentioned equivalent ratio is 1.0/1.0, that is, the product has no hydroxyl groups, curability of the composition is efficient particularly at low temperature. On the other hand, the lower the above-mentioned ratio is, the higher the content of hydroxyl group in the product is.

An example of the process for preparing the component (B) having an alkoxysilyl group other than the above-mentioned process is a process wherein a diallylcarbonate or triallylcarbonate having an allyl group at an end or a side chain of a polycarbonate is reacted with trichlorosilane in the presence of a metal catalyst such as platinum, followed by reaction with an alcohol, or reacted with an alkoxysilane such as trimethoxysilane, triethoxysilane or dimethoxymethylsilane. Another example is a process wherein the polycarbonate polyol is reacted with a diisocyanate such as hexamethylene diisocyanate or isophorone diisocyanate to change the terminal groups of the polycarbonate polyol to isocyanate groups, and further reacted with an aminosilane such as aminopropyltrimethoxysilane.

When the compound containing a hydrolyzable silyl group is used as the component (B), the amount of the component (B) in the composition of the present invention is 1 to 90 parts (parts by weight, hereinafter the same), preferably 5 to 80 parts, more preferably 10 to 80 parts, and the amount of the vinyl polymer containing a hydrolyzable silyl group of the component (A) is 10 to 99 parts, preferably 20 to 95 parts, more preferably 20 to 90 parts, provided that the amount of the components (A) and (B) is 100 parts in total. When the amount of the component (B) is less than one part, the viscosity of the curable composition for paint is increased and it is hard to obtain a high solid paint. On the other hand, when the amount of the component (B) is more than 90 parts, the hardness and weatherability of the film are lowered.

The other compound of the component (B) is the polycarbonate polyol compound. When the polycarbonate polyol is used as the component (B), the component (B) has a hydroxyl group. Therefore, in addition to having a carbonyldioxy group the component (B) reacts and forms a siloxane bond with the vinyl polymer containing a hydrolyzable silyl group of the component (A). Because of the presence of the siloxane bond and the carbonyldioxy group, the curable composition of the present invention can give a film which has sufficient scratch resistance while maintaining sufficient acid resistance. In addition, the component (B) has a comparatively low molecular weight, and therefore it is useful to obtain a high solid paint.

When the polycarbonate polyol compound of the component (B) has more than 20 carbonyldioxy groups, the acid resistance of the cured product tends to lower, and the viscosity of the composition of the present invention tends to increase. When the polycarbonate polyol compound of the component (B) has more than 10 hydroxyl groups, the compatibility with the vinyl polymer containing a hydrolyzable silyl group of the component (A) tends to lower, and the viscosity of the composition tends to increase. On the other hand, when the number average molecular weight of the polycarbonate polyol compound is more than 3,000, it is difficult to obtain curable composition for paint having a high solid content, because the viscosity of the component (B) itself increases. When the number average molecular weight of the polycarbonate polyol compound is less than 250, the compound has volatility and is hard to become a solid component, and therefore it is not suitable to prepare a high solid paint.

Concrete examples of the above-mentioned polycarbonate polyol compounds of the component (B) are, for instance, diols such as "PLACCEL CD-205PL", "CD-208PL" and "CD-210", triols such as "CD-305" and "CD-308", and tetraols such as "CD-610" (which all are commercially available from DAICEL CHEMICAL INDUSTRIES, LTD.).

When the above-mentioned polycarbonate polyol compound is used as the component (B), the amount of the component (B) in the composition of the present invention is 1 to 90 parts, preferably 5 to 80 parts and the amount of the vinyl polymer containing a hydrolyzable silyl group of the component (A) is 10 to 99 parts, preferably 20 to 95 parts, provided that the amount of the components (A) and (B) is 100 parts in total. When the amount of the component (B) is less than one part, the viscosity of the curable composition for paint is increased and it is hard to obtain a high solid paint. On the other hand, when the amount of the component (B) is more than 90 parts, the hardness and weatherability of the cured product are lowered.

Further, in mixing the component (A) and the polycarbonate polyol of the component (B), the equivalent ratio of hydroxyl groups and $R^1O$-Si bonds in the mixture is from 0.01/1.0 to 1.5/1.0, preferably from 0.02/1.0 to 1.0/1.0, more preferably from 0.02/1.0 to 0.5/1.0. When the equivalent ratio is less than 0.01/1.0, the cured product does not have sufficient scratch resistance. On the other hand, when the equivalent ratio is more than 1.5/1.0, the curability of the composition and the water resistance of the cured product are lowered.

Examples of the curing catalyst used as the component (C) in the present invention are, for instance, organolin compounds, phosphoric acid or phosphoric esters, addition reaction products of phosphoric acid and/or phosphoric monoester with an epoxy compound, organic titanate compounds, organic aluminum compounds, acidic compounds including saturated or unsaturated polyvalent carboxylic acids or their anhydrides, sulfonic acid compounds, reaction products of the foregoing sulfonic acid compounds with an amine, amines, reaction products of an amine with an acid phosphoric ester, alkaline compounds, and the like.

Concrete examples of the organotin compounds are dibutyltin dilaurate, dibutyltin dimaleate, dioctyltin dilaurate, dioctyltin dimaleate, tin octate, and the like. Concrete examples of the acid phosphate are monomethyl phosphate, monoethyl phosphate, monobutyl phosphate, monooctyl phosphate, monodecyl phosphate, dimethyl phosphate, diethyl phosphate, dibutyl phosphate, dioctyl phosphate, didecyl phosphate, and the like. As to the addition reaction product of the phosphoric acid and/or acid phosphoric monoester with the epoxy compound, concrete examples of the epoxy compounds are propylene oxide, butylene oxide, cyclohexene oxide, glycidyl methacrylate, glycidol, acryl glycidyl ether, γ-glycidoxypropyltrimethoxysilane, γ-glycidoxypropyltriethoxysilane, γ-glycidoxypropylmethyldimethoxysilane,

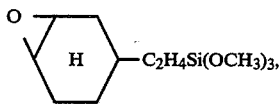

commercially available from Yuka Shell Kabushiki Kaisha), "Epicore 828" (epoxy resin), "Epicore 1001" (which are commercially available from Yuka Shell Kabushiki Kaisha), and the like. Concrete examples of the carboxylic acid are, maleic acid, adipic acid, azelaic acid, sebacic acid, iraconic acid, citric acid, succinic acid, phthalic acid, trimellitic acid, pyrromellitic acid, and the like. Concrete examples of the sulfonic acid are dodecylbenzenesulfonic acid, p-toluenesulfonic acid, and the like. Concrete examples of the amine are hexylamine, di(2-ethylhexyl)amine, N,N-dimethyldodecylamine, dodecylamine, DABCO, DBU, morpholine, and the like. Concrete examples of the alkaline compounds are sodium hydroxide, potassium hydroxide, and the like.

Such curing catalysts may be used alone, or if necessary, as a mixture thereof.

Among these catalysts, the organotin compounds, the acid phosphates, the reaction products of the acid phosphate and the amine, the saturated or unsaturated polyvalent carboxylic acids or their anhydrides, the sulfonic acids, the reaction products of the amine with the sulfonic acid, the organic titanate compounds and the organic aluminum compounds, and mixtures thereof are preferable, since these compounds have high activity.

Among the above-mentioned catalysts, the sulfonic acid compound in which the sulfonic acid group is blocked with an amine is more preferable from the view point of one package storage stability at ordinary temperature and curability in baking at not less than 100° C. (usually not less than 120° C.).

Examples of the above-mentioned sulfonic acid compound are dodecylbenzenesulfonic acid, 1-octanesulfonic acid, p-toluenesulfonic acid, 2-acrylamido-2-methylpropanesulfonic acid, and the like.

Examples of the amine used for blocking the above-mentioned sulfonic acid compound are a linear or branched aliphatic amines, cyclic aliphatic amines, aromatic amines, and the like. Among the above-mentioned amines, primary or secondary amines having at least one hydroxyl group in a molecule and morpholine are preferable from the viewpoint of curability and one package storage stability. Morpholine is more preferable.

Concrete examples of the above-mentioned amine are 2-(methylamino)ethanol, diisopropanolamine, 2-amino-2-methyl-1-propanol, 3-amino-1-propanol, 1-amino-2-propanol, 6-amino-1-hexanol, 4-amino-1butanol, 2-amino-2-methyl-1-propanol, morpholine and the like.

As the ratio of the above-mentioned amine to the above-mentioned sulfonic acid, it is preferable that the amine is used in an amount of from 0.5 to 3.0 equivalents, more preferably from 0.75 to 2.5 equivalents, in particular preferably from 0.9 to 2.0 equivalents, per equivalent of the sulfonic acid group. When the amine is used in an amount of less than 0.5 equivalent per equivalent of the sulfonic acid, one package storage stability tends to be lowered or appearance of film tends to be deteriorated. When the amine is used in an amount of more than 3.0 equivalents, film tends to yellow or water resistance of the film tends to be lowered.

The amount of the above-mentioned component (C), namely a curing catalyst, is from 0.001 to parts, preferably from 0.05 to 10 parts, based on 100 parts of the total of the component (A) and the component (B). When the component (C) is used in an amount of less than 0.001 part, curability tends to be lowered and when the component (C) is used in an amount of more than 10 parts, appearance of the film tends to be deteriorated.

In order to further lower viscosity, the composition of the present invention may contain organopolysiloxanesilanol, or a tetraalkoxysilane, an alkyltrialkoxysilane, a partial-hydrolysate thereof, an amino resin such as melamine resin, a polyol or the like in an amount of preferably not more than 50 parts, more preferably not more than 30 parts based on 100 parts of the total of the component (A) and the component (B). When organopolysiloxanesilanol is added in an amount of more than 50 parts, scarch resistance rather lowers. When the tetraalkoxysilane, alkyltrialkoxysilane, or partial-hydrolysate thereof is added in an amount of more than 50 parts, the compatibility lowers or the internal stress amino increases. Furthermore, when the amino resin such as melamine resin is added in an amount of more than 50 parts, the acid resistance rather lowers, and when a polyol is added in an amount of more than 50 parts, the water resistance lowers.

The composition of the present invention may contain a hydrolyzable ester compound as a dehydrating agent and an alkyl alcohol as a solvent.

As concrete examples of the dehydrating agent, there can be exemplified ester compounds such as methyl orthoformate, ethyl orthoformate, methyl orthoacetate, ethyl orthoacetate, ethyl silicate and methyl silicate, hydrolyzable as ester compounds such as methyltrimethoxysilane and the like.

These dehydrating agents may be added during polymerization to obtain the component (A) or after the polymerization. The amount of the dehydrating agent is not more than 70 parts, preferably not more than 50 parts, more preferably not more than 20 parts, based on 100 parts of the total of the component (A) and the component (B). When the dehydrating agent is added in an amount of more than 70 parts, the effect of stabilizing an alkoxysilyl group is not further improved and it is rather hard to obtain a high solid paint.

As the alkyl alcohol as a solvent, alcohols having 1 to 10 carbon atoms can be exemplified. As concrete examples of such alcohol, there are, for example, methyl alcohol, ethyl alcohol, n-propyl alcohol, isopropyl alcohol, n-butyl alcohol, isobutyl alcohol, sec-butyl alcohol, tert-butyl alcohol, n-amyl alcohol, isoamyl alcohol, hexyl alcohol, octyl alcohol, cellosolve and the like.

The amount of the above-mentioned alcohol is not particularly limited. The amount is generally not more than 70 parts, preferably not more than 50 parts, more preferably not more than 20 parts, based on 100 parts of the total of the component (A) and the component (B). In the case that the solvent is used alone without a dehydrating agent, the amount is generally from 0.5 to 70 parts, preferably from 1 to 50 parts, more preferably from 2 to 20 parts. When the alcohol is used in an amount of less than 0.5 part, almost no effect of stabilizing an alkoxysilyl group is expected. When the alcohol is used in an amount of more than 70 parts, it is hard to obtain a high solid paint.

In the case that the above-mentioned alcohol and the above-mentioned dehydrating agent are used together, storage stability is significantly improved compared to that in the case of storing a composition consisting of the component (A), the component (B) and the component (C). The amount of the solvent which gives such effect is not necessarily fixed because the amount varies depending upon the molecular weights, combination or the like of the components (A), (B) and (C). The amount may be adjusted so that the concentration of solid matter, viscosity and the like fall within practically desired values in the composition.

When the composition of the present invention is used for a top coat, weatherability can be further improved by adding a UV absorber or an agent for improving stability to light, particularly by adding both of them.

As the above-mentioned UV absorber, known absorbers can be widely used. For example, UV absorbers of benzophenones, triazoles, phenylsalicylates, diphenylacrylates, acetophenones and the like are preferable.

As the above-mentioned agent for improving stability to light, known agents can be widely used. There are, for example, bis(2,2,6,6-tetramethyl-4-piperidyl) sebacate, bis(1,2,2,6,6-pentamethyl-4-piperidyl) sebacate, bis(1,2,2,6,6-pentamethyl-4-piperidyl) 2-(3,5-di-tert-butyl-4-hydroxybenzyl)-2-n-butylmalonate, tetrakis(2,2,6,6-tetramethyl-4-piperidyl)-1,2,3,4,-butanetetracarboxylate, tetrakis(1,2,2,6,6-pentamethyl-4-piperidyl)-1,2,3,4-butanetetracarboxylate and the like. The agents for improving stability to light can be used alone or an admixture thereof.

The amount of the above-mentioned UV absorber is generally from 0.1 to 10 parts, preferably 1 to 5 parts, based on 100 parts of the solid matter in the composition.

The amount of the above-mentioned agent for improving stability to light is generally from 0.1 to 10 parts, preferably 1 to 5 parts, based on 100 parts of the solid matter in the composition.

When the amount of each of the UV absorber and the agent for improving stability to light is less than 0.1 part, the effect of improving weatherability is poor, and when the amount is more than 10 parts, the weatherability is not further improved and rather the hardness is lowered.

When the composition of the present invention is used as a clear paint for top coat, there can be added, according to the uses thereof, additives such as a diluent, an agent for preventing cissing and a leveling agent; a cellulose derivative such as nitrocellulose or cellulose acetate butyrate; a resin such as epoxy resin, melamine resin, vinyl chloride resin, chlorinated propylene resin, chlorinated rubber and polyvinyl butyral, or the like.

The process for preparing the composition of the present invention is not particularly limited. The composition of the present invention is prepared by a process wherein a component (A) and a component (B) are cold-blended, or a component (A) and a component (B) are hot-blended to give a partially reacted mixture, and then thus obtained mixture is blended with a component (C) and the like.

The composition of the present invention has low toxicity. A high solid content of from 50 to 70% can be attained. The composition of the present invention can be applied to a substrate in a manner such as spray-coating, brush-coating, roll-coating or dip-coating, then the coating film is cured at about 80° to about 160° C. to give a cured film which is excellent in chemical resistance such as acid resistance, weatherability, scrach resistance and the like. When the compound (II) having hydroxyl group is used as a compound containing a hydrolyzable silyl group, the coating film is preferably cured at about 120° to about 180° C.

The composition of the present invention is extremely useful for coating various articles such as automobiles, outer walls of building, indutrial equipments, steel furnitures and shaped plastics, especially as a paint for top coat of automobiles.

The present invention is more specifically described and explained by means of the following Examples in which all % and part are by weight unless otherwise noted. It is to be understood that the present not invention is limited o the Examples and various changes and modifications may be made in the present invention without departing from the spirit and scope thereof.

REFERENCE EXAMPLE 1

The followings, (Part 1-1 ) to (Part 1-4 ), were prepared.

| (Part 1-1) Mixed solution | |
|---|---|
| Styrene (hereinafter referred to as ST) | 13 g |
| Methyl methacrylate (hereinafter referred to as MMA) | 32 g |
| γ-Trimethoxysilylpropylmethyl methacrylate (hereinafter referred to as TSMA) | 29 g |
| Butyl acrylate (hereinafter referred to as BA) | 25 g |
| Acrylamide (hereinafter referred to as AM) | 1 g |
| γ-Trimethoxysilylpropylmercaptan (hereinafter referred to as TSSH) | 1 g |
| Methyl alcohol (hereinafter referred to as MeOH) | 2 g |
| 2,2'-Azobisisobutyronitrile (hereinafter referred to as AIBM) | 6 g |
| Xylene | 18 g |
| Methyl orthoacetate (hereinafter referred to as MOA) | 2 g |
| (Part 1-2) | |
| Solvesso 100 (commercially available from EXXON CHEMICAL COMPANY) | 14 g |
| (Part 1-3) Mixed solution | |
| AIBN | 0.6 g |
| Xylene | 15 g |
| MeOH | 2 g |
| (Part 1-4) Mixed solution | |
| MOA | 4 g |
| MeOH | 2 g |

The mixed solution (Part 1-1) was added dropwise to (Part 1-2) which was heated to 110° C. in an atmosphere of nitrogen at a uniform velocity over 5 hours. Then thereto was added dropwise the mixed solution (Part 1-3) at a uniform velocity over 1 hour. Subsequently the mixture was stirred at 110° C. for 2 hours, followed by cooling to room temperature. Then thereto was added the mixed solution (Part 1-4) and the mixture was stirred.

The concentration of solid matter in the obtained solution was 63%. The number average molecular weight of the obtained polymer was found to be 4,000 according to GPC analysis.

REFERENCE EXAMPLE 2

The followings, (Part 2-1) to (Part 2-4), were prepared.

| (Part 2-1) Mixed solution | |
|---|---|
| ST | 13 g |
| MMA | 30 g |
| TSMA | 39 g |
| BA | 7 g |
| Isobutyl methacrylate | 10 g |
| N-t-butylacrylamide | 1 g |
| TSSH | 1 g |
| 2,2'-Azobis (2-methylbutylonitrile) (trade name: V-59, commercially available from Wako Junyaku Kogyo Kabushiki Kaisha) | 6 g |
| Solvesso 100 | 20 g |
| n-Butanol | 2 g |
| (Part 2-2) | |
| Xylene | 19 g |
| (Part 2-3) Mixed solution | |
| V-59 | 0.6 g |
| Xylene | 8 g |
| (Part 2-4) Mixed solution | |
| MOA | 6 g |
| MeOH | 4 g |

The mixed solution (Part 2-1) was added dropwise to (Part 2-2) which was heated to 110° C. in an atmosphere of nitrogen at a uniform velocity over 5 hours. Then thereto was added dropwise the mixed solution (Part 2-3) at a uniform velocity over 1 hour. Subsequently the mixture was stirred at 110° C. for 2 hours, followed by cooling to room temperature. Then thereto was added the mixed solution (Part 2-4) and the mixture was stirred.

The concentration of solid matter in the obtained solution was 63 %. The number average molecular weight of the obtained compound was found to be 4,200 according to GPC analysis.

REFERENCE EXAMPLE 3

Full silylation

Into a solution of 458 g of PLACCEL CD-205PL (polycarbonate diol having a hydroxyl value of 225, commercially available from Daicel Chemical Industries, Ltd.) in 160 g of xylene, was added dropwise 342 g of 3-isocyanatopropyltrimethoxysilane in an atmosphere of nitrogen at room temperature over 30 minutes. Successively the mixture was stirred at room temperature for 16 hours.

The infrared absorption spectrum of the reaction solution was analyzed. The absorption band based on NCO at 2270 cm$^{-1}$ competely disappeared and the formation of urethane bond was recognized from the absorption band at 1540cm$^{-1}$. Then thereto was added 40 g of MOA, followed by stirring to give a solution wherein the content of solid matter was 79%.

REFERENCE EXAMPLE 4

½ silylation

Into a solution of 508 g of PLACCEL CD-305 (polycarbonate triol having a hydroxyl value of 315, commercially available from Daicel Chemical Industries, Ltd.) in 160 g of xylene was added dropwise 292 g of 3-isocyanatopropyltrimethoxysilane in an atmosphere of nitrogen at room temperature over 30 minutes. Successively the mixture was stirred at room temperature for 16 hours.

After the identification according to its infrared absorption spectrum of the reaction solution as in Reference Example 3, thereto was added 40 g of MOA, followed by stirring to give a solution wherein the content of solid matter was 79%.

REFERENCE EXAMPLE 5

¼ silylation

The procedures of Reference Example 4 were repeated except for using 621 g of PLACCEL CD-305 and 179 g of 3-isocyanatopropyltrimethoxysilane to give a solution wherein the content of solid matter was 79%.

REFERENCE EXAMPLE 6

Full silylation

The procedures of Reference Example 4 were repeated except for using 391 g of PLACCEL CD-305 and 409 g of 3-isocyanatopropyltrimethoxysilane to give a solution wherein the content of solid matter was 79%.

REFERENCE EXAMPLE 7

Silylation of allyl group

Into a solution of 150 g of PLACCEL CD-205PL in 890 g of toluene was added 57 g of pyridine in an atmosphere of nitrogen, and then thereto was added a solution of 94 g of allyl chlorofomate in 60 g of toluene. After stirring at 60° C. for 1 hour, the mixture was washed with 1N hydrochloric acid and then with purified water. The mixture was dehydrated over magnesium sulfate and toluene was distilled away under reduced pressure. With respect to the obtained product, $^1$H-NMR spectrum and iodine value were measured. Thus quantitative allyation of hydroxyl group was recognized.

Into 100 g of the obtained product were added 0.1 g of a solution containing 10 % chloroplatinic acid in isopropanol and 57 g of trimethoxysilane in an atmosphere of nitrogen. The mixture was subjected to reaction at 90° C. for 3 hours. Then the excess trimethoxysilane was distilled away under reduced pressure. The $^1$H-NMR spectrum and iodine value of the obtained product were measured. Therefrom the silylation degree was determined to be 98 %.

REFERENCE EXAMPLE 8

Reaction with diisocyanate and aminosilane

Into a solution of 233 g of isophorone diisocyanate and 0.2 g of dibutyltin dilaurate in 119 g of xylene was added dropwise a solution of 250 g of PLACCEL CD-205PL in 203 g of xylene in an atmosphere of nitrogen at 80° C. over 1 hour. The mixture was stirred at 80° C. for 30 minutes. The infrared absorption spectrum of the reaction solution was analyzed. It was confirmed that the absorption band based on OH around 3,400cm$^{-1}$ completely disappeared.

Then thereto was added dropwise a solution of 179 g of A- 1110 ( trade name, commercially available from NIPPON UNICAR CO., LTD.) in 22 g of xylene at 60° C. over 30 minutes. The mixture was stirred at 60° C. for 30 minutes. After cooling to room temperature, thereto were added 13 g of methanol and 33 g of MOA, followed by further stirring for 30 minutes.

The infrared absorption spectrum of the obtained product was analyzed. It was recognized that the absorption band based on NCO at 2270cm$^{-1}$ completely disappeared and the formation of urethane bond and urea bond was recongized from the absorption bands at 1,540cm$^{-1}$ and 1,630cm$^{-1}$, respectively.

REFERENCE COMPARATIVE EXAMPLE

Full silylation

Into a solution of 459 g of PLACCEL 205AL (polycaprolactone triol having a hydroxyl value of 224, commercially available from Daicel Chemical Industries, Ltd.) in 160 g of xylene was added dropwise 341 g of 3-isocyanatopropyltrimethoxysilane in an atmosphere of nitrogen at room temperature over 30 minutes. Successively the mixture was stirred for 16 hours.

After the identification according to its infrared absorption spectrum as in Reference Example 3, thereto was added 40 g of MOA, followed by stirring to give a solution wherein the content of solid matter was 79%.

COMPARATIVE REFERENCE EXAMPLE 2

½ silylation

Into a solution of 403 g of PLACCEL 303 (polycaprolactone triol commercially available from Daicel Chemical Industries, Ltd., having a hydroxyl value of 540) in 160 g of xylene was added dropwise 397 g of 3-isocyanatopropyltrimethoxysilane in an atmosphere of nitrogen at room temperature over 30 minutes, and then the solution was stirred for 16 hours at room temperature.

After identification of the infrared absorption spectrum of the solution in the same manner as in Reference Example 3, thereto was added 40 g of MOA, followed by stirring to give a solution wherein the content of solid matter was 79%.

EXAMPLES 1-7 AND COMPARATIVE EXAMPLES 1-5

Each polymer obtained in Reference Example 1 and 2, and each organic compound obtained in Reference Example 3, 4 and 5 and Comparative Reference Example 1 and 2, were mixed according to the formulation shown in Table 1. A leveling agent (#1984-50 commercially available from Kusumoto Chemicals Ltd. ) and a mixture of DP-8R (trade name: dioctyl phosphate commercially available from Daihachi Chemical Industry Co., Ltd. )/DBU (1, 8-diazabicyclo[5, 4, 0]-7-undecene)=8/2 (weight ratio) as a curing catalyst of component (C) were added in amounts of 0.4 % and 1 %, respectively, on the basis of the total solid matter in each Example or Comparative Example. The mixture was diluted with Solvesso 100 so that a paint having a viscosity (Ford Cup) of 15 to 20 seconds was prepared. Thus a clear paint for top coat was obtained.

A mild steel plate which was previously degreased and subjected to a phosphatizing treatment was coated with an automobile epoxy amide cationic electroprimer and then with an intermediate surfacer to give a test piece. The test piece was further coated with a commercially available acryl-melamine resin coating (silver metallic base) as a base coat.

Subsequently the clear paint for top coat was applied onto the silver metallic base by means of a wet-on-wet coating, and after setting for 20 minutes, the coated piece was baked at 140° C. for 30 minutes. The dry thickness of the base coat was about 15 μm and the dry thickness of the top clear coat was 50 μm.

As to the obtained coating film, the acid resistance, scratch resistance and pencil hardness were determined as follows:

[Acid resistance]

After the test piece was immersed in a 1% sulfuric acid solution at 70° C. for 24 hours, a retention (%) of 20° gloss after immersion to that before immersion was determined. High value of the retention shows that the acid resistance is excellent.

[Scratch resistance]

The test piece was fixed horizontally and an abrasive (a mixture of 1.2% of Dust for Industrial Testing No. 8 provided by Japan Association of Powder Process Industry & Engineering, 1.2% of Dust for Industrial Testing No. 11 provided by the same as above, 0.6% of kaolin, 1.0% of a neutral detergent and 96% of water) was applied thereon. A weight diameter of contact surface: 5 cm, load: 22 g/cm$^2$) covered with a kraft paper was stroked against the surface of the coating film. The lightness of the film surface was measured by means of a colour-difference meter before stroke, after 20-time strokes and 100 time-strokes. The scratch resistance was evaluated in terms of lightness difference (ΔL) between the lightness before stroke and that after 20- or 100-time strokes. Law value of ΔL shows that the scratch resistance is excellent.

[Pencil hardness]

The pencil hardness was evaluated according to JIS K 5,400.

The results are shown in Table 1.

As apparent from the results in Table 1, the scratch resistance is improved by adding the component (B) an organic compound containing a carbonyldioxy group and an organic compound containing a hydrolyzable silyl group to the component (A), a polymer containing a hydrolyzable silyl group. The composition of the present invention is also excellent in acid resistance, compared with the composition prepared by adding an organic compound containing a caprolactone structure to the component (A), a polymer containing a hydrolyzable silyl group.

EXAMPLES 8-12 AND COMPARATIVE EXAMPLE 6

The same procedures in Examples 1-7 and Comparative Examples 1-5 except that the components shown in Table 2 and a mixture of morpholine/dodecylbenzenesulfonic acid=½ (weight ratio) was used as the component in an (C) amount of 2% were repeated to give desired paints and the coating films obtained therefrom were evaluated. The results are shown in Table 2.

REFERENCE EXAMPLE 9

The followings, (Part 9-1 ) to (Part 9-4 ), were prepared.

|  | Mixed solution |
|---|---|
| (Part 9-1) | |
| ST | 13 g |
| MMA | 18 g |
| TSMA | 52 g |
| Butyl methacrylate | 16 g |
| t-Butylacrylamide | 1 g |
| 2,2'-Azobis (2-methylbutylonitrile) | 3 g |
| (V-59 commercially available from Wako Junyaku Kogyo Kabushiki Kaisha) | |
| Solvesso 100 | 17 g |
| n-Butanol | 2 g |
| (Part 9-2) | |
| Xylene | 17 g |
| (Part 9-3) | |
| V-59 | 0.2 g |

-continued

| | Mixed solution |
|---|---|
| Xylene | 11 g |
| n-Butanol | 2 g |
| (Part 9-4) | |
| MOA | 6 g |
| MeOH | 2 g |

Subsequently, the mixed solution (Part 9-1) was added dropwise to xylene (Part 9-2) which was heated to 130° C. in an atmosphere of nitrogen at a uniform velocity over 4 hours. Thereto was added dropwise the mixed solution (Part 9-3) at a uniform velocity over 0.5 hour. Then the mixture was stirred at 130° C for 1 hour, followed by cooling to room temperature. Finally, thereto was added the mixed solution (Part 9-4) and the mixture was stirred.

The concentration of solid matter in the obtained solution was 61%. The number average molecular weight of the obtained compound was found to be 3,000 according to GPC analysis.

EXAMPLES 13-17 AND COMPARATIVE EXAMPLES 7-11

The polymer obtained in Reference Example 1 or 9, and polycarbonate polyol or other compounds shown in Table 3 were mixed according to the formulation shown in Table 3. A leveling agent (#1984-50 commercially available from Kusumoto Chemicals Ltd.) and a mixture of diisopropanolamine/dodecylbenzenesulfonic acid=3/7 (weight ratio) as the curing catalyst of the component (C) were added in amounts of 0.4% and 2%, respectively, on the basis of the total solid matter in each Example or Comparative Example. The mixture was diluted with Solvesso 100 so that a paint having a viscosity (Ford Cup) of 15 to 20 seconds was prepared. Thus a clear paint for top coat was obtained.

The same procedures as in Examples 1-7 and Comparative Examples 1-5 were repeated to give coating films and the films were evaluated. The results are shown in Table 3.

EXAMPLES 18-26

The same procedures as in Example 14 except that each amine shown in Table 4 was used instead of the amine used in Example 14 were repeated to give desired paints. With respect to the paints, the rate of change of viscosity and the gel fraction were measured. The results are shown in Table 4.

Example 27

The same procedures as in Example 14 except that the curing catalyst shown in Table 4 was used instead of the curing catalyst used in Example 14 were repeated to give a desired paint. With respect to the paint, the rate of change of viscosity and the gel fraction were measured. The results are shown in Table 4.

EXAMPLES 28-29

The same procedures as in Example 14 except that dodecylbenzenesulfononic acid was used alone or a mixture of dioctylphosphate/1,8-diazabicyclo[5,4,0]-7-undecene was used instead of the curing catalyst used in Example 14 were repeated to give paints. With respect to the paints, the rate of change of viscosity and the gel fraction were measured. The results are shown in Table 4.

[Rate of change of viscosity]

The viscosity of a paint at 23° C. is measured by means of Ford Cup after storing at 50° C. for 14 or 28 days. The rate of change of viscosity is a value obtained by dividing the measured value by an value of initial viscosity. Low rate of change of viscosity shows an excellent storage stability.

[Gel fraction]

A piece of the clear film baked at 140° C. for 30 minutes was wrapped with a 300-mesh stainless wire net weighed exactly ($W_0$), and the weight of the whole was measured exactly ($W_1$). For an extract treatment, it was dipped in acetone for 24 hours and then dried. Then the weight thereof was measured exactly ($W_2$). The gel fraction was calculated according to the following formula. A high value of gel fraction near 100% shows the a rate of an acetone-insoluble matter in the film is high and a degree of crosslinking is large.

$$\text{Gel fraction (\%)} = \frac{W_2 - W_o}{W_1 - W_o} \times 100$$

As apparent from the results in Table 3, the scratch resistance is improved by adding the component (B), polycarbonate polyol to the component (A), a polymer containing a hydrolyzable silyl group. The composition of the present invention is excellent in acid resistance, compared with the composition obtained by adding polycaprolactone diol to the component (A), a polymer containing a hydrolyzable silyl group or the composition of acryl-melamine resin alone.

Moreover, from the results in Table 4, it is apparent that the composition using an organotin compound or sulfonic acid blocked with amine as a curing catalyst of component (C) has a low rate of change of viscosity and is excellent in stoage stability as a one package paint and also excellent in curability.

As apparent from the above detailed explanation, the composition of the present invention has low toxicity and a high solid content and can give an excellent film having well-balanced acid resistance, scratch resistane and hardness. The composition of the present invention is a curable paint composition having excellent storage stability as a one package paint.

TABLE 1

| | Com. Ex. 1 | Com. Ex. 2 | 1 | 2 | 3 | 4 | 5 | 6 | 7 | Com. Ex. 3 | Com. Ex. 4 | Com. Ex. 5 |
|---|---|---|---|---|---|---|---|---|---|---|---|---|
| Component of clear paint for top coat (part) | | | | | | | | | | | | |
| Polymer obtained in Ref. Ex. 1 | 100 | | 75 | | 50 | | | | | | | |
| Polymer obtained in Ref. Ex. 2 | | 100 | | 75 | | 50 | 45 | 45 | 50 | 50 | 45 | |
| Organic compound obtained in Ref. Ex. 3 | | | 25 | 25 | 50 | 50 | | | | | | |
| Orgainc compound obtained in Ref. Ex. 4 | | | | | | | 45 | | | | | |
| Organic compound | | | | | | | | 45 | | | | |

TABLE 1-continued

|  | Com. Ex. 1 | Com. Ex. 2 | 1 | 2 | 3 | 4 | 5 | 6 | 7 | Com. Ex. 3 | Com. Ex. 4 | Com. Ex. 5 |
|---|---|---|---|---|---|---|---|---|---|---|---|---|
| obtained in Ref. Ex. 5 |  |  |  |  |  |  |  |  |  |  |  |  |
| Organic compound obtained in Ref. Ex. 6 |  |  |  |  |  |  |  | 50 |  |  |  |  |
| Organic compound obtained in Com. Ref. Ex. 1 |  |  |  |  |  |  |  |  |  |  | 50 |  |
| Organic compound obtained in Com. Ref. Ex. 2 |  |  |  |  |  |  |  |  |  |  | 45 |  |
| Commercial acryl-melamine resin |  |  |  |  |  |  |  |  |  |  |  | 100 |
| Organopolysiloxane silanol |  |  |  |  |  | 10 | 10 |  |  |  | 10 |  |
| Evaluation results |  |  |  |  |  |  |  |  |  |  |  |  |
| Acid resistance | 100 | 100 | 90 | 90 | 80 | 80 | 80 | 80 | 80 | 35 | 40 | 20 |
| Scratch resistance 20 times | 6.0 | 5.5 | 2.2 | 2.0 | 0.5 | 0.3 | 0.8 | 1.0 | 0.2 | 0.3 | 0.8 | 5.0 |
| 100 times | 13.5 | 12.0 | 4.0 | 3.8 | 1.3 | 1.0 | 1.8 | 2.2 | 0.8 | 1.1 | 1.8 | 11.0 |
| Pencil hardness | H | 2H | F | H | HB | F | F | F | H | F | F | H |

(Note)
The part number in table shows a value of solid matter or a value against solid matter.
As organopolysiloxane silanol, SH-6018 commercially available from Dow Corning Toray Silicone Company Ltd. was used.

TABLE 2

|  | 8 | 9 | 10 | 11 | 12 | Com. Ex. 6 |
|---|---|---|---|---|---|---|
| Component of clear paint for top coat (part) |  |  |  |  |  |  |
| Polymer obtained in Ref. Ex. 1 | 50 | 50 | 75 | 50 |  | 50 |
| Polymer obtained in Ref. Ex. 2 |  |  |  |  | 25 |  |
| Organic compound in Ref. Ex. 3 | 50 |  |  |  |  |  |
| Organic compound in Ref. Ex. 7 |  | 50 | 20 |  |  |  |
| Organic compound in Ref. Ex. 8 |  |  |  | 45 | 75 |  |
| PLACCEL CD 205PL |  |  |  |  |  | 45 |
| Organopolysiloxane-silanol |  |  | 5 | 5 |  | 5 |
| Evaluation results |  |  |  |  |  |  |
| Acid resistance | 80 | 80 | 90 | 80 | 70 | 30 |
| Scratch resistance 20 times | 0.4 | 0.4 | 2.4 | 0.5 | 0.2 | 0.6 |
| 100 times | 1.4 | 1.5 | 4.5 | 1.6 | 0.6 | 1.6 |
| Pencil hardness | HB | HB | F | HB | 2B | 4B |

(Notes) As organopolysiloxane silanol, SH-6018 commercially available from Dow Corning Toray Silicone Company, Ltd. was used.

TABLE 3

|  | Com. Ex. 7 | Com. Ex. 8 | 13 | 14 | 15 | 16 | 17 | Com. Ex. 9 | Com. Ex. 10 | Com. Ex. 11 |
|---|---|---|---|---|---|---|---|---|---|---|
| Component of clear paint for top coat (part) |  |  |  |  |  |  |  |  |  |  |
| Polymer obtained in Ref. Ex. 1 | 100 |  | 80 |  | 60 |  | 80 |  |  |  |
| Polymer obtained in Ref. Ex. 2 |  | 100 |  | 70 | 80 |  | 50 |  | 50 |  |
| Polycarbonate diol |  |  | 20 | 30 |  | 20 | 40 |  |  |  |
| Polycarbonate triol |  |  |  |  | 20 |  |  |  |  |  |
| Polycaprolactone diol |  |  |  |  |  |  |  | 20 | 40 |  |
| Organopolysiloxane silanol |  |  |  |  |  | 13 |  |  |  |  |
| Melamine resin |  |  |  |  |  | 7 | 10 |  | 10 |  |
| Commercial acryl-malamine resin |  |  |  |  |  |  |  |  |  | 100 |
| Evaluation results |  |  |  |  |  |  |  |  |  |  |
| Acid resistance | 100 | 100 | 95 | 90 | 95 | 90 | 85 | 60 | 40 | 10 |
| Scratch resistance 20 times | 6.0 | 5.0 | 2.5 | 1.5 | 1.9 | 2.8 | 0.2 | 2.8 | 0.4 | 5.0 |
| 100 times | 13.5 | 12.0 | 5.4 | 2.8 | 5.0 | 5.6 | 0.8 | 6.0 | 1.2 | 11.0 |
| Pencil hardness | H | 2H | F | HB | 2H | F | F | H | F | H |

(Note)
As polycarbonate diol, polycarbonate triol and polycaprolactone diol, PLACCEL CD-205HL, PLACCEL CD-305 and PLACELL 205 commercially available from Daicel Chemical Industries, Ltd. were used, repectively.
As organopolysiloxane silanol. SH-6018, commercially available from Dow Corning Toray Silicone Company Ltd. was used.
As melamine resin, Seimel 235 commercially available from MITSUI-CYANAMID, Ltd. was used.

TABLE 4

|  | Curing catalyst | Gel fraction (%) | Rate of Change of viscosity | | |
|---|---|---|---|---|---|
|  |  |  | Initial | 14 days | 28 days |
| Ex. 18 | Dodecylbenzensulfonic acid blocked with triethylamine | 83 | 1.0 | 1.0 | 1.1 |
| Ex. 19 | Dodecylbenzensulfonic acid blocked with di-n-butylamine | 87 | 1.0 | 1.0 | 1.0 |
| Ex. 20 | Dodecylbenzensulfonic acid blocked with butylamine | 70 | 1.0 | 1.0 | 1.0 |
| Ex. 21 | Dodecylbenzensulfonic acid blocked with 2-amino-2-methyl-1-propanol | 94 | 1.0 | 1.0 | 1.0 |
| Ex. 22 | Dodecylbenzensulfonic acid blocked with | 88 | 1.0 | 1.0 | 1.0 |

TABLE 4-continued

| | Curing catalyst | Gel fraction (%) | Rate of Change of viscosity | | |
|---|---|---|---|---|---|
| | | | Initial | 14 days | 28 days |
| | 2-dimethylaminoethanol | | | | |
| Ex. 23 | Dodecylbenzensulfonic acid blocked with 1-amino-2-propanol | 93 | 1.0 | 1.0 | 1.0 |
| Ex. 24 | Dodecylbenzensulfonic acid blocked with 2-(methylamino)ethanol | 93 | 1.0 | 1.0 | 1.0 |
| Ex. 25 | Dodecylbenzensulfonic acid blocked with diisopropanol amine | 93 | 1.0 | 1.0 | 1.0 |
| Ex. 26 | Dodecylbenzensulfonic acid blocked with morpholin | 95 | 1.0 | 1.0 | 1.1 |
| Ex. 27 | Di-n-butyltin dilaurate | 94 | 1.0 | 1.3 | 1.8 |
| Ex. 28 | Dodecylbenzensulfonic acid | 95 | 1.0 | 2.9 | 3.9 |
| Ex. 29 | Mixture of dioctylphosphate/ 1,8-diazabicyclo[5,4,0]-7-undecene = 8/2 | 96 | 1.0 | 3.1 | 4.0 |

(Notes) In all examples using a mixture of amine/sulfonic acid, the equivalent of amine was 1.1 per equivelent of sulfonic group, and one part of dodecylbenzensulfonic acid was used per 100 parts of the total of components of the clear paint for top coat of Example 4 shown in Table 3. In other examples, one part of curing catalyst was used per 100 parts of the total of components of the clear paint for top coat of Example 14 shown in Table 3.

What is claimed is:

1. A curable composition for paint comprising
(A) 10 to 99 parts by weight of a vinyl polymer having a number average molecular weight of not less than 2,000 and at least one silicon atom to which a hydrolyzable group is bonded at an end of the main chain and/or in a side chain thereof, in one molecule, wherein the main chain comprises at least 60% by weight vinyl monomer units;
(B) 1 to 90 parts by weight of a compound containing a carbonate group which is at least one of
  (i) a compound containing a hydrolyzable silyl group, the compound having at least one carbonate group in one molecule and at least one silicon atom to which a hydrolyzable group is bonded, in one molecule, and
  (ii) a carbonate polyol compound having at least one carbonate group and at least two hydroxyl groups in one molecule; and
(C) 0.001 to 10 parts by weight of a curing catalyst on the basis of 100 parts by weight of the components (A) and (B) in total.

2. The composition of claim 1, wherein said compound containing a carbonate group of the component (B) has a number average molecular weight of not more than 3,000.

3. The composition of claim 2, wherein said compound containing a carbonate group comprises a compound containing a hydrolyzable silyl group having the formula (I):

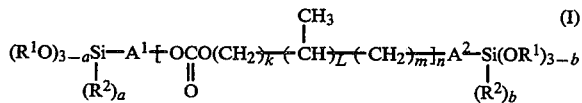

wherein $R^1$ and $R^2$ are the same or different and each is an alkyl group having 1 to 4 carbon atoms, and when two or more $R^1O$ groups or two or more $R^2$ groups are bonded to one silicon atom, the plural $R^1$ groups or the plural $R^2$ groups may be the same or different; $A^1$ and $A^2$ are the same or different and each is a divalent organic group containing at least one organic group selected from the group consisting of a polymethylene group, a urethane group, an urea group, an ether group, an amide group, organopolysiloxane group and a group containing carbonate group; a and b are the same or different and each is 0, 1 or 2; k and m are the same or different and each is 0 or an integer of 1 to 10, and L is 0, 1 or 2 provided that the following equation is satisfied: $k+L+m \geq 2$; and n is an integer of 1 to 20, a compound containing a hydrolyzable silyl group having the formula (II):

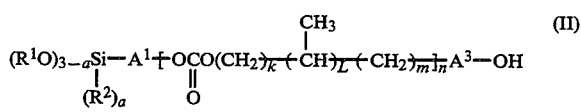

wherein $R^1$, $R^2$, $A^1$, a, k, L, m and n are the same as defined above, and $A^3$ is a divalent organic group containing at least one organic group selected from the group consisting of a polymethylene group, a urethane group, an urea group, an ether group, an amide group, an organopolysiloxane group and a group containing carbonate group, or a mixture of the compound containing a hydrolyzable silyl group having the formula (I) and the compound containing a hydrolyzable silyl group having the formula (II).

4. The composition of claim 1, wherein said curing catalyst is a sulfonic acid compound in which the sulfonic acid group is blocked with an amine in an amount of 0.5 to 3.0 equivalents per equivalent of the sulfonic acid group.

5. The composition of claim 4, wherein said amine is a primary or secondary amine having at least one hydroxyl group in one molecule.

* * * * *